United States Patent [19]

Iwane

[11] Patent Number: 5,105,447

[45] Date of Patent: Apr. 14, 1992

[54] DEMODULATED DATA RECOGNITION AND DECISION DEVICE

[75] Inventor: Yasushi Iwane, Hyogo, Japan

[73] Assignee: Mitsubishi Denki Kabushiki Kaisha, Tokyo, Japan

[21] Appl. No.: 463,214

[22] Filed: Jan. 10, 1990

[30] Foreign Application Priority Data

Aug. 8, 1989 [JP] Japan .................................. 1-205257

[51] Int. Cl.⁵ .................................................. H04L 7/02
[52] U.S. Cl. .......................................... 375/110; 375/94
[58] Field of Search .................. 375/110, 111, 82, 97, 375/94; 307/269, 518, 528, 464; 328/63, 109, 110, 151, ; 329/302, 303, 346, 312, 313

[56] References Cited

U.S. PATENT DOCUMENTS

4,807,260  2/1989  Solina .................................. 375/110
4,868,853  9/1989  Izumita et al. ....................... 375/111
4,871,973  10/1989  Yoshihara .......................... 375/81 X Primary Examiner—Benedict V. Safourek
Assistant Examiner—Tesfaldet Bocure
Attorney, Agent, or Firm—Rothwell, Figg, Ernst & Kurz

[57] ABSTRACT

A demodulated data recognition and decision device is disclosed in which an input signal such as an intermediate frequency signal or the like is demodulated and digital data corresponding to a demodulated base band signal is recovered. This device is characterized in that a sample clock rate having n-times the bit rate of the digital data is applied to perform a sampling operation wherein a decision of the binary value at the plurality of points in the base band signal is carried out to obtain a decision under majority rule. The value decided under majority rule and then applied as the demodulated digital data is substantially free of errors which might occur from jitters in the base band signal and other sources of noise.

13 Claims, 7 Drawing Sheets

| DECISION DATA | | | ADDED VALUE | OUTPUT | |
|---|---|---|---|---|---|
| A | B | C | A + B + C | | |
| 1 | 1 | 1 | 3 | 1 | |
| 1 | 1 | 0 | 2 | 1 | |
| 1 | 0 | 0 | 1 | 0 | THRESHOLD |
| 0 | 0 | 0 | 0 | 0 | |

DEMODULATED DATA RECOGNITION AND DECISION DEVICE

BACKGROUND OF THE INVENTION

1. Field of the Invention

This invention relates to a demodulated data recognition and decision device in which a signal modulated by digital data is demodulated and then the digital data is recovered from an obtained base band signal.

2. Description of the Prior Art

Figure 1:
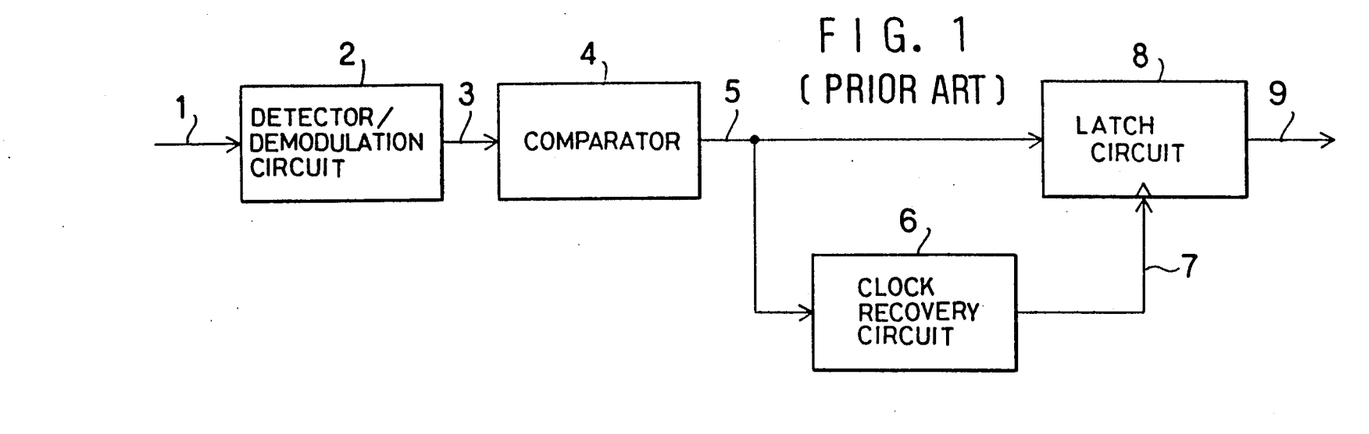
FIG. 1 is a block diagram showing a conventional type of decision device.

FIG. 1 is a block diagram for showing the conventional type of a demodulation data recognition and decision device (hereinafter called a decision device). In this figure, reference numeral 1 denotes an intermediate frequency signal (IF signal) output from an intermediate frequency circuit (not shown) of a previous stage. The detector and demodulation circuit 2 is for receiving the IF signal 1 and demodulating it into an output detection signal (a base band signal) 3. Comparator 4 is for converting the base band signal 3 to a binary value and outputting a binary signal 5. Clock recovery circuit 6 is for use in reproducing a clock signal 7 acting as the synchronous clock of a digital data stream 9 based on the binary signal 5, and 8 is a latch circuit for defining the digital data 9 from the binary signal 5 and the clock signal 7.

Figure 2:
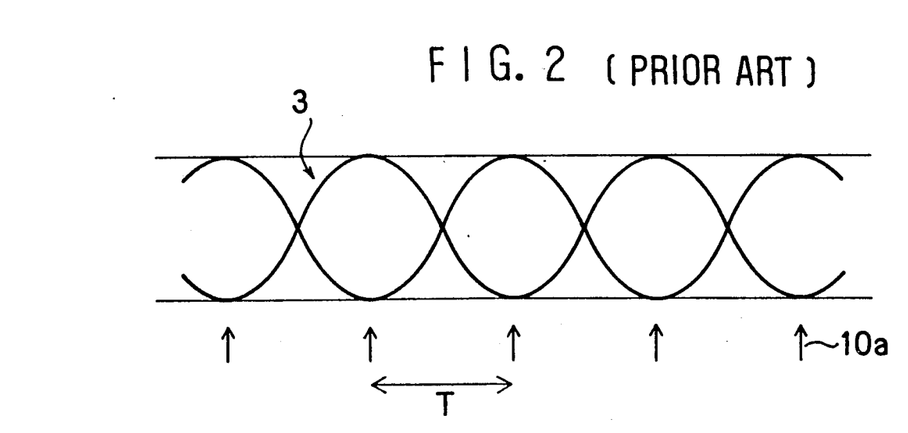
FIG. 2 is a timing diagram showing the timing in a conventional type of recognition and decision device.

FIG. 2 is a timing diagram for indicating decision timing in the decision device shown in FIG. 1. In this figure, reference numeral 3 denotes the base signal 3 in FIG. 1 in a form of an eye pattern, and this wave-form is defined as a detection eye output. Reference numeral 10a denotes a decision timing and in this case this corresponds to the falling edge of the recovered clock signal 7 (in case of performing a data latching with the falling edge) and so reference symbol T corresponds to one symbol duration, i.e., the reciprocal of the symbol rate, of the digital data 9.

The operation of the prior art decision device will be described hereinafter. IF signal 1 is demodulated to the base band signal 3 acting as an analogue signal with the detection and demodulation circuit 2. This base band signal 3 is made as a binary value with a proper threshold value in the comparator 4. A binary signal 5 output by the comparator 4 is input into the latch circuit 8 and the clock recovered circuit 6. The clock recovery circuit 6 outputs the recovery clock signal 7 having the same rate as a bit rate of transmitted data on the basis of the binary signal 5. Since it is known that it is advantageous to sample the received waveform when the eye opening, as indicated in FIG. 2, is largest, it is preferable that the falling edge of the recovered clock signal 7 corresponds to the point in which the eye opening of the detected eye output 3 is the largest in size. Then, in the latch circuit 8, the input binary signal 5 is latched with the falling edge of the recovered clock signal 7 and output as a digital data 9.

Since the conventional type of decision device has been constructed as described above, problems have developed in that the timing in which the latch circuit 8 may latch the binary signal 5 is displaced from the point at which the eye opening is largest, and as a result, a margin of signal to noise is decreased which increases a rate of error. This displacement can result from the generation of a frequency or phase jitter of the base band signal 3 caused by the fading and/or the noise of a transmission line, i.e. in the case of generating a lateral jitter in the detected eye output 3. These errors can also result from the presence of an error in frequency or in phase of the recovered clock signal 7 or the like.

SUMMARY OF THE INVENTION

The present invention solves the above-mentioned problems by utilizing an arrangement having a decision device capable of reducing the deterioration characteristics of data demodulation caused by a jitter in the timing of recognition and decision and further capable of improving the durability of data demodulation with respect to noise when digital data is to be recognized and decided from a base band signal.

The decision device of the present invention includes a clock recovery circuit for generating a higher rate signal than a data rate of the demodulated digital data together with a recovery clock signal, and a multi-timing decision means for performing a binary recognition under majority rule of values in a plurality of timings for either a binary signal or a quantized signal produced from the base band signal by applying the higher rate clock signal.

Means operated under majority rule of the present invention receives either a binary signal or a quantized signal produced by the base band signal and outputs a value defined under majority rule in a plurality of timings for the received signal as demodulated digital data. As a result, an influence of a jitter of the base band signal and/or the reproduction clock signal may be reduced. In addition, the signal level is improved with respect to a random noise and durability against the noise is improved as well.

DETAILED DESCRIPTION OF THE PREFERRED EMBODIMENTS

Figure 3:
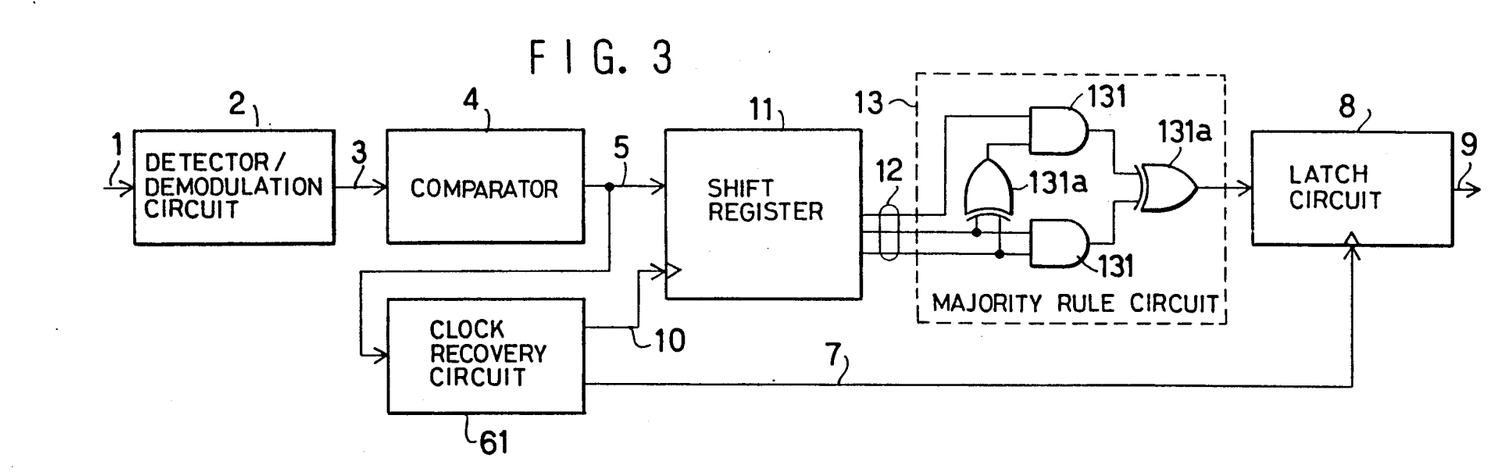
FIG. 3 is a block diagram showing a decision device constructed in one preferred embodiment of the present invention.
Figure 4:
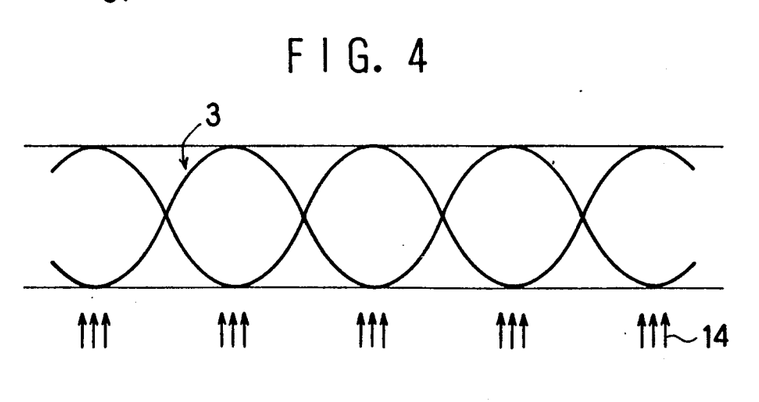
FIG. 4 is a timing diagram showing the timing in recognition and decision in the decision device shown in FIG. 3.

Referring now to the drawings, a preferred embodiment of the present invention will be described. In FIG. 3, reference number 61 denotes a clock recovery circuit for outputting a recovered clock signal 7 and outputting a sample clock signal 10 having a frequency n-times greater than that of the recovered clock signal 7. Shift register 11 is for sampling a binary signal 5 at the frequency defined by the sample clock 10 and for shifting it in sequence. Reference numeral 12 designates a three-point discriminated signal output from the taps of predetermined stages of the shift register 11. Reference numeral 13 designates a majority rule circuit for outputting a value decided by majority rule of the three-point discriminated signal 12. FIG. 4 illustrates the discrimination timing in the decision device shown in FIG. 3, wherein reference numeral 14 denotes a three-point discrimination timing. The three-point discrimination timing 14 is a timing which corresponds to the three-point discriminated signal 12 shown in FIG. 3.

The operation of the demodulated data recognition and decision device will be described hereinafter. At first, an IF signal 1 is converted at a detector and demodulation circuit 2 into a base-band signal 3 in the same manner as that of the prior art and is further converted into a binary signal 5 by a comparator 4. Then, a clock recovery circuit 61 outputs a recovered clock signal 7 having the same frequency as the bit rate of a transmitted data and simultaneously outputs a sample clock signal 10 having a rate n-times higher than that of the recovered clock signal 7. The period of this sample clock 10 determines a timing interval of the three-point recognition timing 14 shown in FIG. 4. In turn, the binary signal 5 is input to the shift register 11. The shift register 11 is used to sample the binary signal 5 with the sample clock 10 and then shift it in sequence. The three-point discriminated signal 12 which is a part of a parallel output of the shift register 11 is output as a time series signal, so that a simultaneous handling of these signals means that the discrimination of data from the eye output are carried out at a plurality of points. The majority rule circuit 13 can receive the three-point discriminated signal 12 and output a digital value determined by the majority rule to a latch circuit 8. As can readily be seen from majority rule circuit 13, the arrangement of AND gates 131 and exclusive OR gates 131a will output digital value "1" when 2 or 3 values of the three-point discriminated signal 12 are "1" and will output "0" when 2 or 3 values of signal 12 are "0". And if the recovered clock signal 7 is set to fall just after (a timing) in which the desired three samples (samples corresponding to the three-point recognition and decision timing 14) are shifted to a position of the three-point discriminated signal 12, it is possible to latch a value decided under majority rule of the three-point discriminated signal 12. Then, the value latched by the latch circuit 8 is output as a demodulated digital data 9. As described above, the binary decision of the base band signal 3 is carried out at three points, which enables the optimum point, i.e., the point of the largest eye opening, to be always included and thus to affect the final decision by the majority rule even if the base band signal and/or the recovered clock has same jitter. Errors which might occur from the jitter of the base band signal 3 and/or the recovered clock signal 7 can therefore be reduced or eliminated. Accordingly, the errors resulting from the influence of noise are greatly reduced or cancelled.

Figure 5:
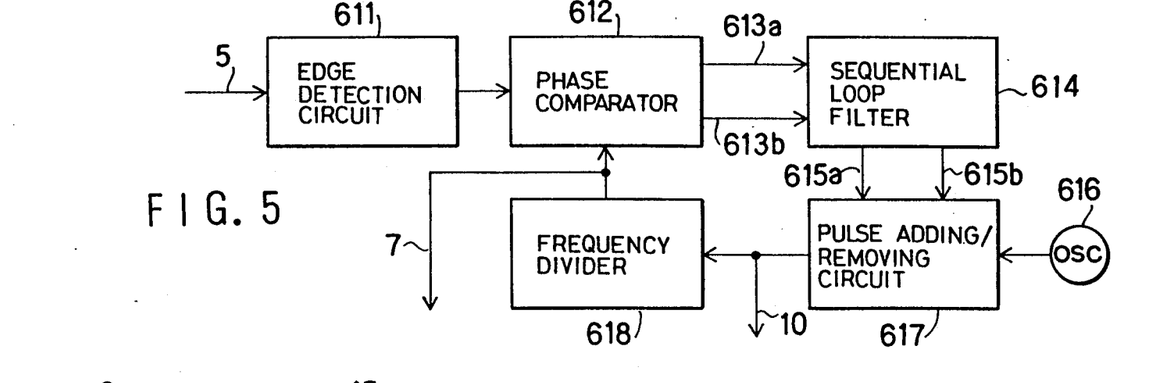
FIG. 5 is a block diagram showing the clock reproduction circuit shown in FIG. 3.

FIG. 5 is a block diagram for showing an example of a clock recovery circuit 61 which is constructed as a DPLL (Digital Phase Locked Loop). The operation of the clock recovery circuit 61 constructed as above will hereinafter be described. At first, a varying point of the binary signal 5 is detected by an edge detection circuit 611. This detection is the same as though a zero-cross point of the base band signal 3 is detected. Then, a phase comparison between the zero-crossing point of the base band signal and a rising edge of the recovered clock signal 7 is carried out by the phase comparator 612. As a result of comparison, if the phase of the zero-cross point advances as to the phase of the rising edge of the recovered clock signal 7, a lag signal 613a may be output, and also, if the phase of the zero-cross point is not advanced, a lead signal 613b may be output and received by sequential loop filter 614. Since the sequential loop filter 614 has a low-pass filter characteristic, an influence caused by noise is eliminated. An advancing control signal 615a is output in response to the lag signal 613a and a delay control signal 615b is output in response to the lead signal 613b. Reference numeral 616 denotes a fixed oscillator for use in outputting a fixed frequency signal. A pulse adding/removing circuit 617 may add one pulse to an output signal of the fixed oscillator 616 in response to an advance controlling signal 615b. It may remove one pulse from the output signal of the fixed oscillator 616 in response to a delay control signal 616a. In this case, a variable frequency divider may be arranged in place of the pulse adding/removing circuit 617 so as to vary a frequency dividing ratio. An output of either the pulse adding/removing circuit 617 or the variable frequency divider is applied as the sample clock pulse 10. Further, this output may be divided in its frequency by the frequency divider 618 and input to the phase comparator 612 and at the same time it becomes the recovery clock signal 7. In order to cause the falling timing of the recovery clock signal 7 to be coincided with the latch timing of the latch circuit 8, it may be sufficient to construct the frequency divider 618 in such a way that a ratio between ON segment and OFF segment of the recovery clock signal 7 is made unequal. Or, another shift register can be inserted between the frequency divider 618 and the latch circuit 8 while the ratio between the ON segment and OFF segment is being kept equal, and then the recovered clock signal 7 may be displaced.

Figure 6:
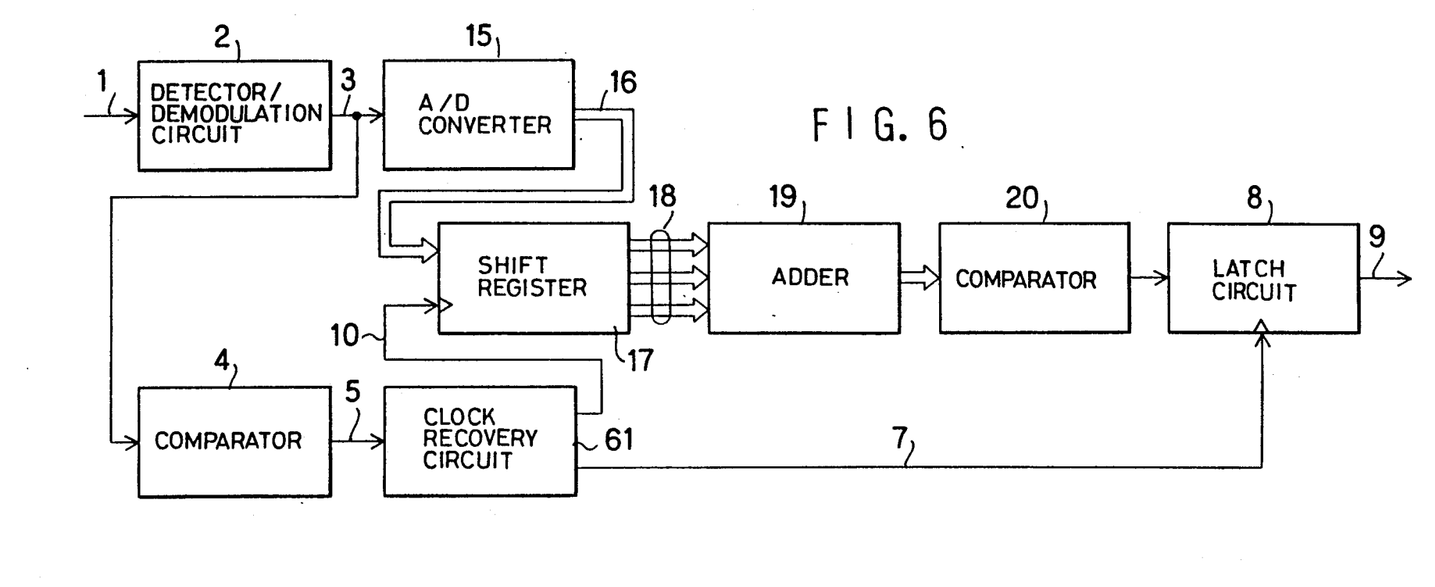
FIGS. 6 through 8 are block diagrams showing decision devices constructed in accordance with other preferred embodiments of the present invention.

FIG. 6 is a block diagram showing a decision device constructed in accordance with another preferred embodiment of the present invention. In this figure, reference numeral 15 denotes an A/D converter in which the base band signal 3 is converted into m-bit quantized signal 16 (hereinafter referred to as "soft-decision data"), where each sampled base band signal is expressed with m-bit digital data. And reference numeral 17 denotes a parallel shift register each stage of which is constructed with m-bits and m-bit data is shifted in parallel. Reference numeral 18 represents a plurality of points of soft decision data output from predetermined taps of the shift register 17 (in FIG. 6, three-point soft decision data is illustrated). Adder 19 and comparator 20 are used in comparing an added value output from the adder 19 with a predetermined threshold value.

The operation of the decision device in accordance with a further preferred embodiment will be described hereinafter. In this case, the base band signal 3 in a form of an analog wave is converted by the A/D converter into a soft decision data 16 of quantized signal having a value ranging from 0 to $2^m - 1$. Also the base band signal 3 is converted into a binary signal 5 by the comparator 4. Then, both recovered clock signal 7 and the sample clock 10 are output from the clock recovery circuit 61 in the same manner as that of the first preferred embodiment. In this case, each stage of the shift register 17 is constructed of m-bits, wherein the soft decision data 16 is sampled in response to the sample clock 10 and then shifted in sequence. Then, the plurality of points of soft decision data 18 which is a part of parallel output of the shift register 17 is added by the adder 19. The added value is compared with a predetermined threshold value by the comparator 20. The comparator 20 may output a binary signal in response to a relation of value between the added value and the threshold value.

Figure 11:
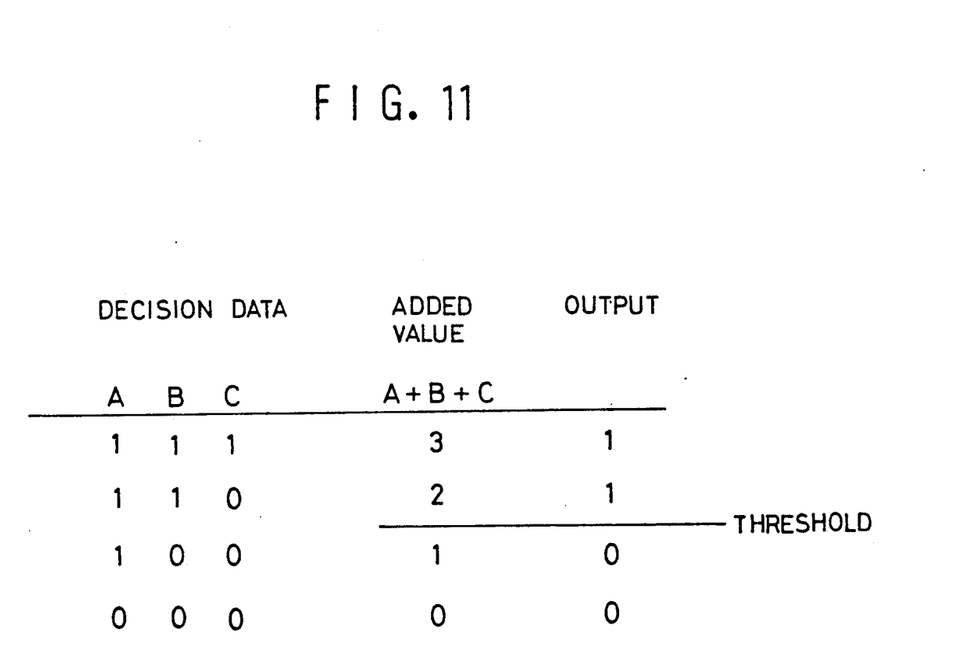
FIG. 11 illustrates making a majority rule decision for three samples utilizing an adder and a comparator.

FIG. 11 illustrates how comparing the added values with a threshold value is equivalent to making a majority rule of three samples. Reference letters A, B and C denote the values of soft decision data 18. As can be seen, when the added value is above or below a threshold value, in this case 2, the comparator outputs digital value "1" or "0" accordingly.

Furthermore, if the recovered clock signal 7 is set in such a way that its leading edge may fall just after a timing in which predetermined three samples are shifted up to the positions of three-point soft decision signal 18 (if required, considering a delay caused by the adder 19 and the comparator 20), the result is that a recognition and decision caused by the desired three samples is latched by the latch circuit 8. Comparing the value of three quantized values added to each other with a predetermined threshold value is equivalent to making a majority rule of three samples. This preferred embodiment of the present invention enables the binary decision of the base band signal to be carried out at a plurality of points, one of which corresponding to where the opening in the eye wave is largest as in the first embodiment. Accordingly, errors resulting from the influence of noise are greatly reduced or cancelled. A converting timing in the A/D converter 15 can be determined by the applied sample clock 10.

Figure 7:
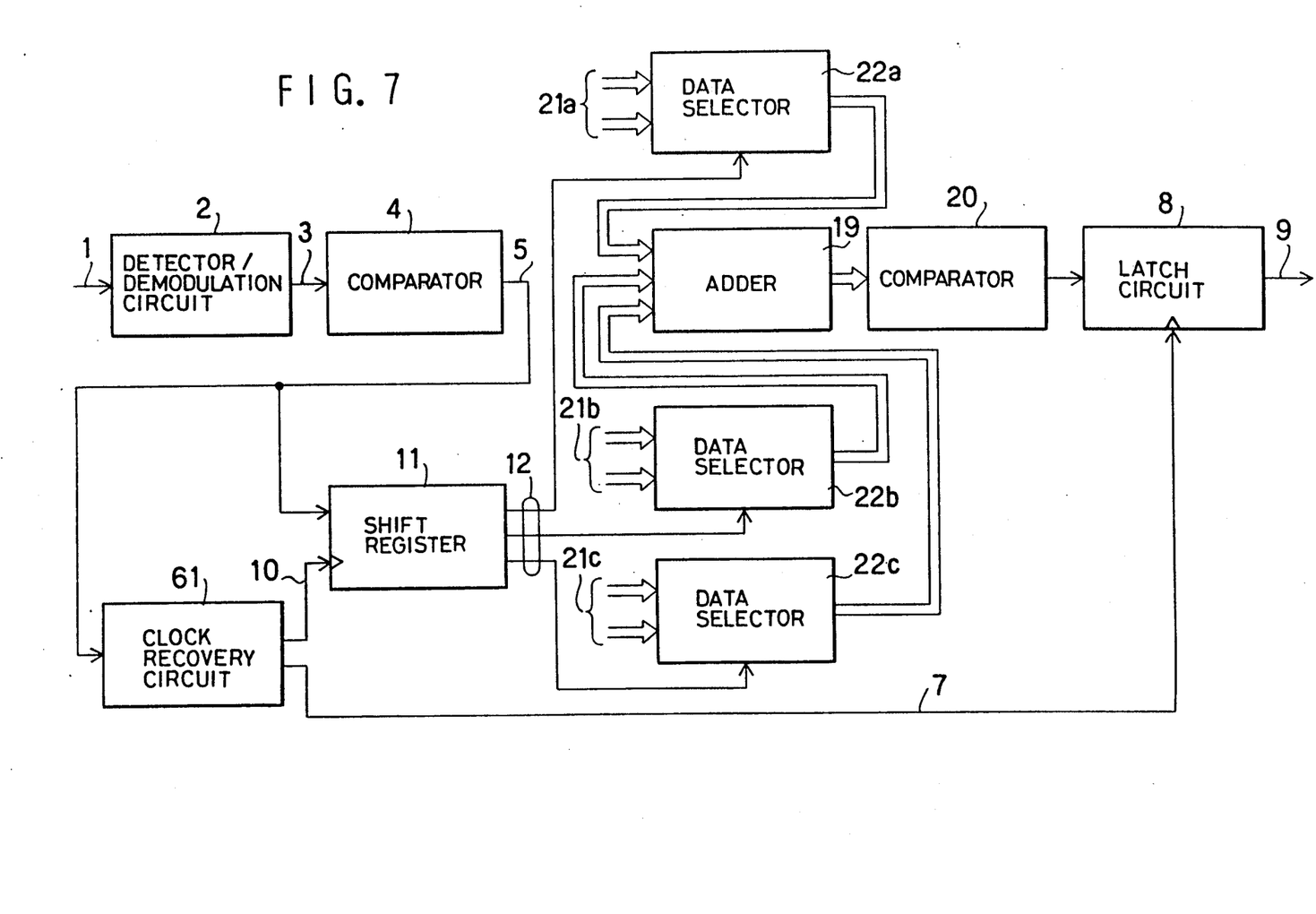

FIG. 7 is a block diagram showing a decision device constructed in accordance with still another preferred embodiment of the present invention. In this figure, reference numerals 21a to 21c denote two types of digital values, for example, (1, −1), (2, −2), (1, −1) respectively; each set of digital values has a value which corresponds to "0" and other corresponds to "1" from the three-point discriminated signal 12. Reference numerals 22a to 22c denote data selectors which output each of the digital values 21a to 21c. These digital values 21a–21c, or weighing factors, can be m-bit numbers which are output from the data selectors as m-bit numbers (plus or minus) to go to adder 19.

An operation of this preferred embodiment will be described hereinafter. A binary signal 5 is input into the shift register 11 in the same manner as that of the first preferred embodiment and the shift register 11 outputs a three-point discriminated signal (hard decision values) 12. Since each of the three-point discriminated signals 12 is a selection input for the data selectors 22a to 22c, the data selectors 22a to 22c output one of the digital values 21a to 21c in response to the value ("1" or "0") of the three-point discriminated signal 12. After this operation, a processing similar to that of the second preferred embodiment shown in FIG. 6 will be carried out. In this case, the digital values 21a to 21c are set to values which assign more importance to the central point, thereby it is possible to carry out a decision of majority rule upon weighing each of a plurality of discriminating points. In the example where if each of the digital values 21a to 21c is set to (1, −1), (2, −2) and (1, −1), respectively, the central point of the three points is weighed twice as much as compared with the other points.

Figure 8:
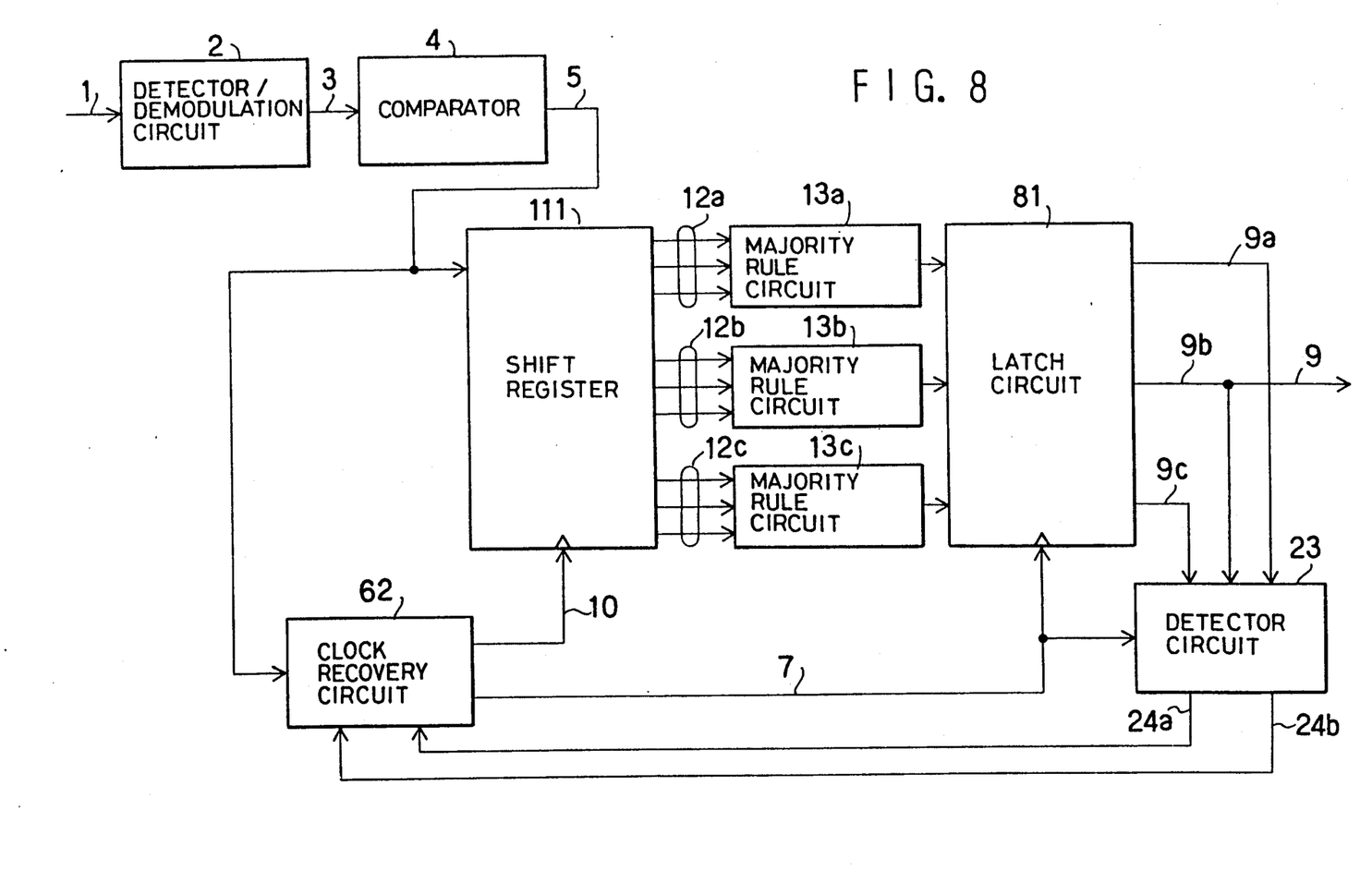

FIG. 8 is a block diagram for showing a decision device capable of following a bit synchronization. In this figure, reference numeral 62 denotes a clock recovery circuit capable of performing simultaneous varying of a phase of the recovered clock signal 7. Shift register 111 is for outputting in parallel three sets of three-point discriminated signals 12a to 12c and elements 13a to 13c are each of majority rule circuits. Latch circuit 81 is for use in latching each of the output values of the three majority rule circuits 13a to 13c. Detector circuit 23 is for detecting a lead/lag of the decision timing through comparison of output values of the latch circuit 81; 24a represents a lead signal and 24b represents a lag signal.

Figures 9, 10:
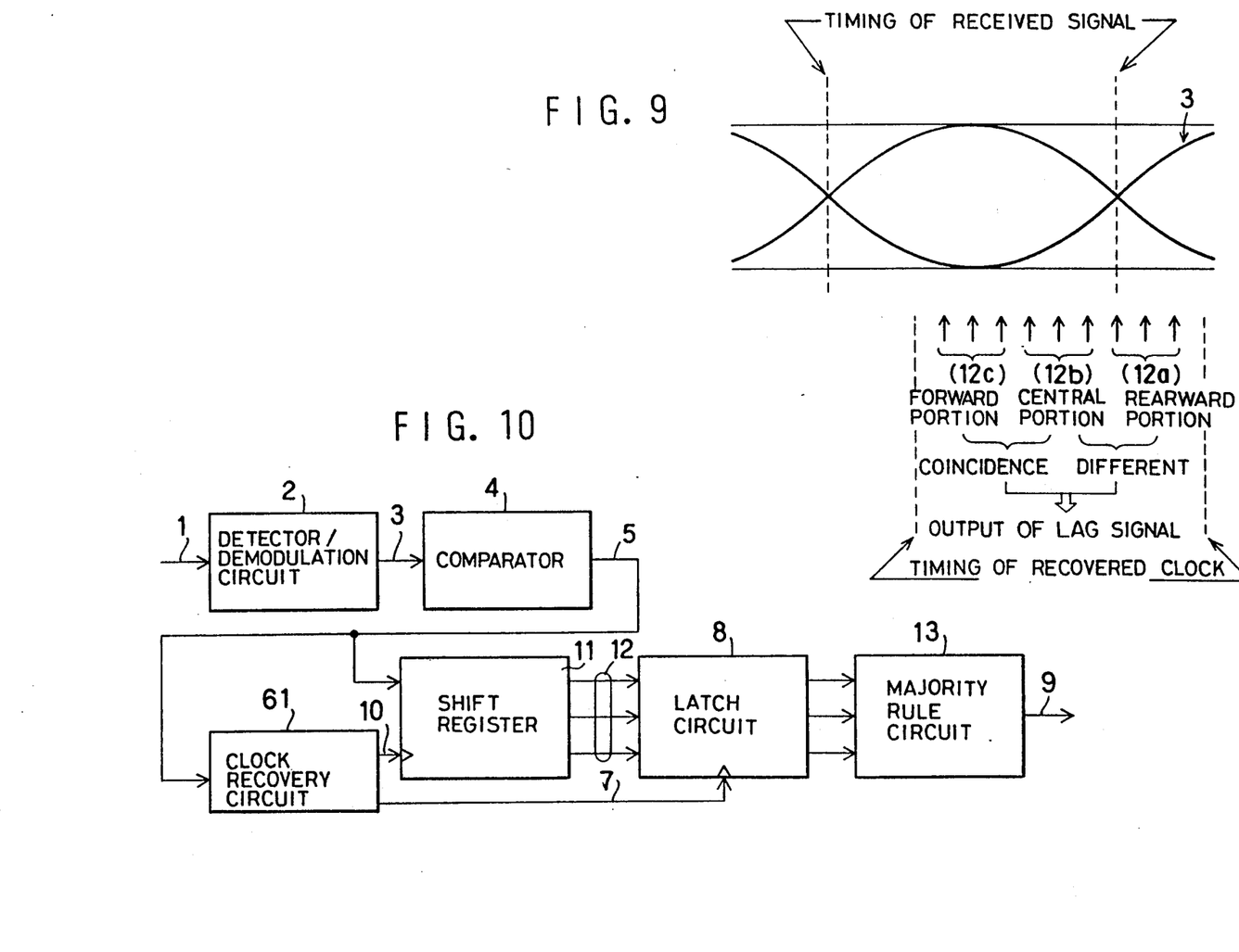
FIG. 9 is an illustrative view showing a clock following operation in the decision device shown in FIG. 8.
FIG. 10 is a block diagram showing a decision device constructed in accordance with a still further preferred embodiment of the present invention.

The operation of this embodiment will be described as follows. A binary signal 5 output from the comparator 4 is input to the shift register 111 and the clock recovery circuit 62. The shift register 111 may sample the binary signal 5 with the sample clock 10 produced by the clock recovery circuit 62 and then shift it in sequence. The three-point discriminated signals 12a to 12c which are a part of the parallel output of the shift register 111 are input to the majority rule circuits 13a to 13c, respectively. As a result, the three sets of the three-point discriminated signals 12a to 12c are sampled from the three portions of rearward, central and forward widths, respectively corresponding to one-bit in the base band signal 3 as shown in FIG. 9. The majority rule circuits 13a to 13c which function similarly to circuit 13 as shown in FIG. 3, output a value as decided by the majority rule of each of the three-point discriminated signals 12a to 12c. A value latched with the output value of the majority rule circuit 13b corresponding to the central portion is output from the latch circuit 81 as the reproduced digital data 9. That is, the data decided at the central portion is applied as the digital data 9. Simultaneously with this operation, the three values having latched output values of the three majority rule circuits 13a to 13c are output from the latch circuit 81 to the detector circuit 23. The detection circuit 23 detects a lead or lag of the timing in recognition and decision on the basis of three values.

A practical detection operation will be described in reference to FIG. 9. The dashed line in FIG. 9 denotes the state of displacement between a data varying point in the received signal and another data varying point recognized by the decision device. Since the sample clock 10 is generated in synchronism with the recovered clock signal 7, if the recovered clock signal 7 is displaced with respect to the base band signal 3, the three-point discriminated signal 12b corresponding to the central portion in the latch timing in the latch circuit 81 will not correspond to the actual central portion of the detected eye output 3. For example, as the period of the recovered clock signal 7 is extended, the value which corresponds to the three-point discriminated signal 12b latched by the latch circuit 81 results in the three-point sample value displaced from the true central portion as shown in FIG. 9. At this time, the three-point discriminated signal 12a at the rearward portion is influenced by the subsequent bit. It is assumed that the data in the shift register 111 are shifted in the direction from 12a toward 12c. If the range of displacement is wide, the value 9c corresponding to the forward portion and the value 9 corresponding to the central portion of the three values received by the detector circuit 23 are the same and then the value 9a corresponding to the rearward portion may become a different value. In this case, the detector circuit 23 recognizes that the recovered clock signal 7 is delayed in respect to the base band signal 3. Thus, a lag signal 24b is output to the clock recovery circuit 62. The clock recovery circuit 62 advances instantaneously a phase of the recovered clock signal 7 in response to the lag signal 24b. Then, since the sample clock 10 may also be varied instantaneously in synchronous with this operation in an advanced direction, the three-point discriminated signal 12b corresponding to the central portion returns to the actual central portion of the detected eye output 3. Also, in case that the value 9 corresponding to the central portion and the value 9a corresponding to the rearward portion are the same and the value 9c corresponding to the forward portion is different from that value, a lead signal 24a will be output. The clock recovery circuit 62 delays instantaneously the recovered signal 7 in response to the lead signal 24a. As described above, it is possible to improve a reliability of the reproduced digital data 9 and at the same time to perform a following operation of bit synchronization. This detector circuit 23 may be simply constructed with ROMs in which the three values 9a, 9 and 9c are applied as address inputs and the lag signal 24b or the lead signal 24a or value not outputting both of them is applied as data.

Although each of the preferred embodiments as described, includes an arrangement in which the latch circuits 8 and 81 are arranged at the rear stages of majority rule circuits 13, 13a to 13c, the latch circuits may also be arranged in front of the majority rule circuits 13, 13a to 13c. FIG. 10 illustrates an example in which the deciding device constructed in accordance with the first preferred embodiment is modified and illustrates this technical concept. Since the operation of the deciding device constructed as above is substantially the same as that of the first preferred embodiment, its description will be eliminated. It is apparent that the same technical concept can be applied not only to the first preferred embodiment, but also to the above-mentioned preferred embodiments. In this embodiment, a latch circuit may additionally be placed downstream from the majority rule circuits to reduce or eliminate noise associated with gate operations.

In each of the above-mentioned preferred embodiments, since the sample clock 10 having n-times of the bit rate of the digital data 9 produced by the clock recovery circuits 61 and 62 is applied to perform a sampling operation, a plurality of discriminated signals 12, 12a to 12c and 18 are all signals having an equal time interval. It may also be applicable that other clock signals are applied in place of the sample clock 10 and/or output taps of the shift registers 11 and 111 are set discontinuously so as to produce signals having non-equal intervals.

What is claimed is:

1. A demodulated data recognition and decision device comprising a detector demodulation circuit for demodulating a transmitted data modulated input signal and outputting a base band signal; a comparator for determining a binary value of said base band signal and outputting the binary signal; a clock recovery circuit for receiving the binary signal and recovering a clock signal therefrom and reproducing a recovered clock signal having the same frequency as that of a bit rate of transmitted data and generating a higher rate clock signal than said recovered clock signal; multi-timing decision means for sampling said binary signal with said higher rate clock signal, performing a majority rule decision operation for a plurality of values corresponding to a plurality of points of the sampled binary signal, and outputting a value obtained through said majority rule decision operation; and a latch circuit for latching the output value of said multi-timing decision means in response to said recovered clock signal and outputting the latched value as a demodulated digital data.

2. A demodulated data recognition and decision device according to claim 1, wherein the multi-timing decision means comprises a shift register for sampling and producing sampled values of said binary signal with said higher rate clock signal and shifting the sampled values in sequence, and a majority rule circuit for receiving predetermined outputs of a plurality of stages of parallel outputs of said shift register and outputting values decided under majority rule of these output values of a plurality of stages to said latch circuit.

3. A demodulated data recognition and decision device comprising a detector demodulation circuit for demodulating a transmitted data modulated input signal and outputting a base band signal; a first comparator for determining a binary value of said base band signal and outputting the binary signal; a clock recovery circuit for receiving the binary signal and recovering a clock signal therefrom and reproducing a recovered clock signal having the same frequency as that of a bit rate of transmitted data and generating a higher rate clock signal than said recovered clock signal; an A/D converter for converting said base band signal into a multi-value quantized signal; a shift register for sampling said multi-value quantized signal with said higher rate clock signal and shifting the sampled values in sequence; an adder for receiving predetermined outputs from a plurality of stages of parallel outputs of said shift register and adding these outputs from said plurality of stages; and a second comparator for comparing an added value output by said adder with a predetermined threshold value and outputting a binary data signal corresponding to a relation of value between the added value and the threshold value to said latch circuit.

4. A demodulated data recognition and decision device according to claim 1, wherein said multi-timing decision means comprises a shift register for sampling said binary signal with said higher rate clock signal and shifting a sampled value in sequence, said shift register outputting parallel outputs from a predetermined plurality of stages, a plurality of data selectors for receiving said outputs of said shift register and each selectively outputting a digital value from sets of values, said digital value corresponding to a binary value of said binary signal, an adder for adding said digital values output from said plurality of data selectors, and a comparator for comparing the added values output by said adder with a predetermined threshold value and outputting binary data corresponding to a relation between the added value and the threshold value to said latch circuit.

5. A demodulated data recognition and decision device according to claim 4, wherein said sets of values comprises a selected set of digital values which are more heavily weighed to higher values than other sets of values and wherein said selected set of digital values having more heavily weighed higher values corresponds to a central point of said digital values outputted from said plurality of data selectors.

6. A demodulated data recognition and decision device comprising a detector demodulation circuit for demodulating a transmitted data modulated input signal and outputting a base band signal; a comparator for determining a binary value of said base band signal and outputting a corresponding binary signal; a clock recovery circuit for receiving the binary signal and recovering a clock signal therefrom and reproducing a recovered clock signal having the same frequency as a bit rate of said input signal and producing a higher rate clock signal relative to said recovered clock signal; a shift register for sampling said binary signal with said higher rate clock signal and shifting a sampled value in sequence, said shift register outputting predetermined parallel outputs of a plurality of stages; a latch circuit for latching said predetermined parallel outputs in response to each of said recovered clock signals; and a majority rule circuit for outputting the value decided under majority rule of the values output by said latch circuit as a demodulated digital data.

7. A demodulated data recognition and decision device according to claims 2 to 6, wherein the plurality of predetermined states of the shift register comprise three stages.

8. A demodulated data recognition and decision device comprising a detector demodulation circuit for demodulating a transmitted data modulated input signal and outputting a base band signal; a comparator for determining a binary value of said base band signal and outputting the binary signal; a clock recovery circuit for receiving the binary signal and recovering a clock signal therefrom and reproducing a recovered clock signal having the same frequency as a bit rate of a transmitted data, and generating a higher rate clock signal than said recovered clock signal, said clock recovery circuit receiving a lag signal or a lead signal, instantaneously advancing a phase of said recovered clock signal in response to said lag signal, and instantaneously delaying a phase of said recovered clock signal in response to said lead signal; and a multi-timing decision means for sampling said binary signal with said higher rate clock signal, performing majority rule for a plurality of values received from said means for sampling, outputting the values obtained from said performing of majority rule and outputting said lag signal or said lead signal when the sampling occurs at a position displaced from the central portion of the detected eye output of said base band signal.

9. A demodulated data recognition and decision device according to claim 8, wherein the multi-timing decision means comprises a shift register for sampling said binary signal with said higher rate clock signal and shifting the sampled value in sequence, majority rule circuits for receiving each of a plurality of sets of outputs of a plurality of predetermined stages of parallel outputs of said shift register, said majority rule circuits outputting each value decided under majority rule for every set of said plurality of sets so as to be installed in correspondence with said plurality of sets; a latch circuit for latching the output values of said majority rule circuits in response to said recovered clock signal; and a detector circuit for receiving output values of said latch circuit and outputting either said lag signal or lead signal.

10. A demodulated data recognition and decision device according to claim 9, wherein said plurality of sets of outputs comprises a central set(,a forward set and a rearward set), the value corresponding to the central set of said plurality of sets of the output values of said latch circuit is output as digital data.

11. A demodulated data recognition and decision device according to claim 10, wherein each of said plurality of sets is constituted by parallel outputs of three stages of said shift register.

12. A demodulated data recognition and decision device according to claim 10 or 11, wherein said plurality of sets are three sets.

13. A demodulated data recognition and decision device according to claim 12, wherein the detector circuit outputs a lag signal when the received value of said rearward set is different from the value of the other two sets, and outputs the lead signal when the value of said forward set is different from the value of the other two sets.

* * * * *

UNITED STATES PATENT AND TRADEMARK OFFICE
CERTIFICATE OF CORRECTION

PATENT NO. : 5,105,447
DATED : April 14, 1992
INVENTOR(S) : Yasushi Iwane It is certified that error appears in the above-identified patent and that said Letters Patent is hereby corrected as shown below:

Column 3, line 53, "same" should be --some--.

Column 6, line 25, after "13a to 13c" insert a comma --,--.

Signed and Sealed this

Fifth Day of October, 1993

*Attest:*

BRUCE LEHMAN

*Attesting Officer*  *Commissioner of Patents and Trademarks*